(12) United States Patent
Fukuda et al.

(10) Patent No.: US 6,703,336 B2
(45) Date of Patent: Mar. 9, 2004

(54) DIELECTRIC CERAMIC COMPOSITION

(75) Inventors: Shinji Fukuda, Yamaguchi (JP);
Takafumi Kawano, Yamaguchi (JP);
Masataka Yamanaga, Yamaguchi (JP);
Sumio Terada, Yamaguchi (JP); Koichi Fukuda, Yamaguchi (JP)

(73) Assignees: Ube Electronics, Ltd., Yamaguchi (JP);
Ube Industries, Ltd., Yamaguchi (JP)

( * ) Notice: Subject to any disclaimer, the term of this patent is extended or adjusted under 35 U.S.C. 154(b) by 0 days.

(21) Appl. No.: 10/263,911

(22) Filed: Oct. 2, 2002

(65) Prior Publication Data

US 2003/0100430 A1 May 29, 2003

(30) Foreign Application Priority Data

Oct. 4, 2001 (JP) ........................ 2001-308342
Oct. 4, 2001 (JP) ........................ 2001-308343
Aug. 28, 2002 (JP) ........................ 2002-248935

(51) Int. Cl.$^7$ .............................. C04B 35/468
(52) U.S. Cl. ........................ 501/139; 501/138
(58) Field of Search ................... 501/139, 138

(56) References Cited

U.S. PATENT DOCUMENTS 5,350,721 A * 9/1994 Abe et al. ............... 501/139
6,602,616 B2 * 8/2003 Sugimoto et al. ........... 428/688

FOREIGN PATENT DOCUMENTS

JP 06-040767 2/1994
JP 06-211564 8/1994

* cited by examiner

Primary Examiner—Karl Group
(74) Attorney, Agent, or Firm—Anderson Kill & Olick, P.C.; Eugene Lieberstein; Michael N. Meller

(57) ABSTRACT

The dielectric ceramic composition of the first aspect of the invention comprises an essential component having a compositional formula of $xBaO\text{-}yTiO_2\text{-}zNd_2O_3$ (wherein $0.02 \leq x \leq 0.2$, $0.6 \leq y \leq 0.8$, $0.01 \leq z \leq 0.3$, $x+y+z=1$), and contains two types of glass powder, one comprising PbO, ZnO and $B_2O_3$ and the other comprising $SiO_2$ and $B_2O_3$, and a third component that comprises $Al_2O_3$, $SrTiO_3$, $GeO_2$ and $Li_2O$. Its advantages are that it can be sintered at low temperatures, its dielectric constant $\epsilon_r$ falls between 10 and 50 or so, its unloaded Q is large, and its temperature-dependent resonant frequency change is small. The dielectric ceramic composition of the second aspect of the invention comprises an essential component having a compositional formula of $s(xBaO\text{-}yTiO_2\text{-}zNd_2O_3)\text{-}tNd_2Ti_2O_7$ (wherein $0.02 \leq x \leq 0.2$, $0.6 \leq y \leq 0.8$, $0.01 \leq z \leq 0.3$, $x+y+z=1$, $0.1 \leq s \leq 0.8$, $0.2 \leq t \leq 0.9$, $s+t=1$), and contains two types of glass powder, one comprising PbO, ZnO and $B_2O_3$ and the other comprising $SiO_2$ and $B_2O_3$, and a third component that comprises $Al_2O_3$, $SrTiO_3$, $GeO_2$ and $Li_2O$. Its advantages are that it can be sintered at low temperatures, its dielectric constant $\epsilon_r$ falls between 10 and 50 or so, its unloaded Q is large, and its absolute value of a temperature coefficient of resonant frequency $\tau_f$ is small. Still another advantage of the composition is that its relative dielectric constant $\epsilon_r$, its unloaded Q and its temperature coefficient of resonant frequency ($\tau_f$) can be controlled in any desired manner by controlling the $Nd_2Ti_2O_7$ content of the composition.

5 Claims, 1 Drawing Sheet

DIELECTRIC CERAMIC COMPOSITION

BACKGROUND OF THE INVENTION

1. Field of the Invention

The present invention relates to a dielectric ceramic composition suitable to the material for dielectric resonators, etc. In particular, the invention relates to a dielectric ceramic composition, which has a relative dielectric constant $\epsilon_r$ of from 10 to 50 or so, which can be sintered at low temperatures, and which has a large unloaded Q value and has a small absolute value of a temperature coefficient of resonant frequency ($\tau_f$).

2. Description of the Related Art

With the recent tendency in the art toward highly integrated microwave circuits, desired are small-sized high-performance dielectric resonators for them. The requirements of dielectric ceramic compositions for such dielectric resonators are that their relative dielectric constant $\epsilon_r$ is relatively large, their unloaded Q is large and their temperature coefficient $\tau_f$ of resonant frequency is small. In general, resonators can be more small-sized with the increase in the relative dielectric constant $\epsilon_r$ of the material for them. However, with the increase in their resonant frequency, resonators are more small-sized. Therefore, in order that resonators are not too much small-sized, the relative dielectric constant $\epsilon_r$ of the material for them is desired to fall within a suitable range depending on the use of resonators. The present invention relates to a dielectric ceramic composition having a relative dielectric constant $\epsilon_r$ of from 10 to 50 or so.

For such dielectric ceramic compositions, proposed are a dielectric ceramic composition of $BaO$—$TiO_2$—$Nd_2O_3$ [Ber. Dt. Keram. Ges., 55 (1978), Nr. 7; Japanese Patent Laid-Open No. 35406/1985] and a dielectric ceramic composition of $BaO$—$TiO_2$—$Nd_2O_3$—$Bi_2O_3$ [Japanese Patent laid-Open No. 72558/1987].

These days disclosed are stacked chip capacitors and stacked dielectric resonators formed of dielectric ceramic composition layers, for which the ceramic composition and the internal electrode are baked simultaneously to give a stacked structure. However, since the temperature at which the dielectric ceramic composition is baked is high, generally falling between 1300 and 1400° C., the composition is often difficult to bake simultaneously with the inner electrode. For this reason, the electrode material for the stacked structure is limited to palladium (Pd), platinum (Pt) and the like that are still stable even at high temperatures. Given that situation, desired in the art are dielectric ceramic compositions that can be combined with any other inexpensive electrode material such as silver (Ag), silver-palladium (Ag—Pd) or copper (Cu) so as to be baked simultaneously with it even at low temperatures not higher than 1200° C. On the other hand, with the recent tendency in the art toward increased channel capacity, the frequency in communication is being shifted to a high frequency region of 2 GHz or more. With that, the dielectric material in the art is now required to have a relative dielectric constant of from 10 to 50 or so.

Regarding the material, Japanese Patent Laid-Open No. 211564/1994 discloses a ceramic substrate prepared by mixing a dielectric ceramic composition of $BaO$—$TiO_2$—$Nd_2O_3$ with a specific glass component followed by baking it; and Japanese Patent Laid-Open No. 40767/1994 discloses a method for producing a dielectric ceramic composition like the mixture capable of being baked even at low temperatures. However, the relative dielectric constant of the dielectric ceramic compositions disclosed in these laid-open patent publications is relatively large, generally falling between 70 and 80 on average, and is therefore unsuitable to use thereof in a high frequency region. Regarding the unloaded Q of these compositions, the fQ value thereof which is a product of Q and the resonant frequency thereof is low, generally falling between 1000 and 3000 GHz or so on average. Therefore desired are dielectric ceramic compositions having a larger unloaded Q. Another important factor of dielectric ceramic compositions is that their characteristics are stable independent of varying ambient temperatures. However, the temperature-dependent capacitance of the dielectric ceramic compositions heretofore disclosed as above fluctuates in a broad range falling between −70 and 40 ppm/° C.

SUMMARY OF THE INVENTION

One object of the present invention is to provide a dielectric ceramic composition having good properties suitable to the material for dielectric resonators, especially to provide such a dielectric ceramic composition, of which the dielectric constant falls between 10 and 50 or so, preferably between 10 and 30 or so, the unloaded Q is large and the temperature-dependent resonant frequency change is small, and which can be sintered well even when baked at low temperatures.

In its first aspect, the invention provides a dielectric ceramic composition including as an essential component a composition represented by the formula of $xBaO\text{-}yTiO_2\text{-}zNd_2O_3$, wherein $0.02 \leq x \leq 0.2$, $0.6 \leq y \leq 0.8$, $0.01 \leq z \leq 0.3$, $x+y+z=1$, with the ceramic composition further comprising:

a first glass component comprising PbO, ZnO and $B_2O_3$;

a second glass component comprising $SiO_2$ and $B_2O_3$, with the first and second component having the following relationship $10 \leq a \leq 80$ and $1 \leq b \leq 100$ wherein "a" indicates the content of the first glass component and "b" indicates the content of the second glass component with both "a" and "b" in parts by weight relative to 100 parts by weight of the essential component; and a third component comprising $Al_2O_3$, $SrTiO_3$, $GeO_2$ and $Li_2O$ with the content of each such compound to be determined from the following: $1 \leq c \leq 60$, $0.1 \leq d \leq 30$, $5 \leq e \leq 30$ and $0.1 \leq f \leq 7$, wherein "c" indicates the content of $Al_2O_3$, "d" indicates the content of $SrTiO_3$, "e" indicates the content of $GeO_2$ and "f" indicates the content of $Li_2O$ all in parts by weight relative to 100 parts by weight of the essential component.

In its second aspect, the invention provides a dielectric ceramic composition including as an essential component a composition represented by the formula of $s(xBaO\text{-}yTiO_2\text{-}zNd_2O_3)\text{-}tNd_2Ti_2O_7$, wherein $0.02 \leq x \leq 0.2$, $0.6 \leq y \leq 0.8$, $0.01 \leq z \leq 0.3$, $x+y+z=1$, $0.1 \leq s \leq 0.8$, $0.2 \leq t \leq 0.9$, $s+t=1$, with the ceramic composition further comprising:

a first glass component comprising PbO, ZnO and $B_2O_3$;

a second glass component comprising $SiO_2$ and $B_2O_3$, with the first and second component having the following relationship $10 \leq a \leq 80$ and $1 \leq b \leq 100$ wherein "a" indicates the content of the first glass component and "b" indicates the content of the second glass component with both "a" and "b" in parts by weight relative to 100 parts by weight of the essential component; and a third component comprising $Al_2O_3$, $SrTiO_3$, $GeO_2$ and $Li_2O$ with the content of each such compound to be determined from the following: $1 \leq c \leq 60$, $0.1 \leq d \leq 30$, $5 \leq e \leq 30$ and $0.1 \leq f \leq 7$, wherein "c" indicates the content of $Al_2O_3$, "d" indicates the content of $SrTiO_3$, "e" indicates the content of $GeO_2$ and "f" indicates the content of $Li_2O$ all in parts by weight relative to 100 parts by weight of the essential component.

The invention also provides a method for producing the dielectric ceramic composition of the second aspect as above, comprising the step of mixing a calcined powder of $xBaO\text{-}yTiO_2\text{-}zNd_2O_3$, wherein $0.02 \leq x \leq 0.2$, $0.6 \leq y \leq 0.8$, $0.01 \leq z \leq 0.3$, $x+y+z=1$ and a calcined powder of $Nd_2Ti_2O_7$ in a predetermined ratio and baking the mixed powders.

The advantages of the dielectric ceramic composition which the invention provides herein are that its dielectric constant falls between 10 and 50 or so, preferably between 10 and 30 or so, its unloaded Q is at least 3000 GHz in terms of its fQ value and is large, and its temperature coefficient $\tau_f$ of resonant frequency does not fluctuate but is stable, falling between −15 and 12 ppm/° C. In addition, the dielectric ceramic composition of the invention can be sintered at low temperatures, and can form layers along with an internal electrode of Ag, Ag—Pd, Cu or the like.

DETAILED DESCRIPTION OF THE INVENTION

Figure 1:
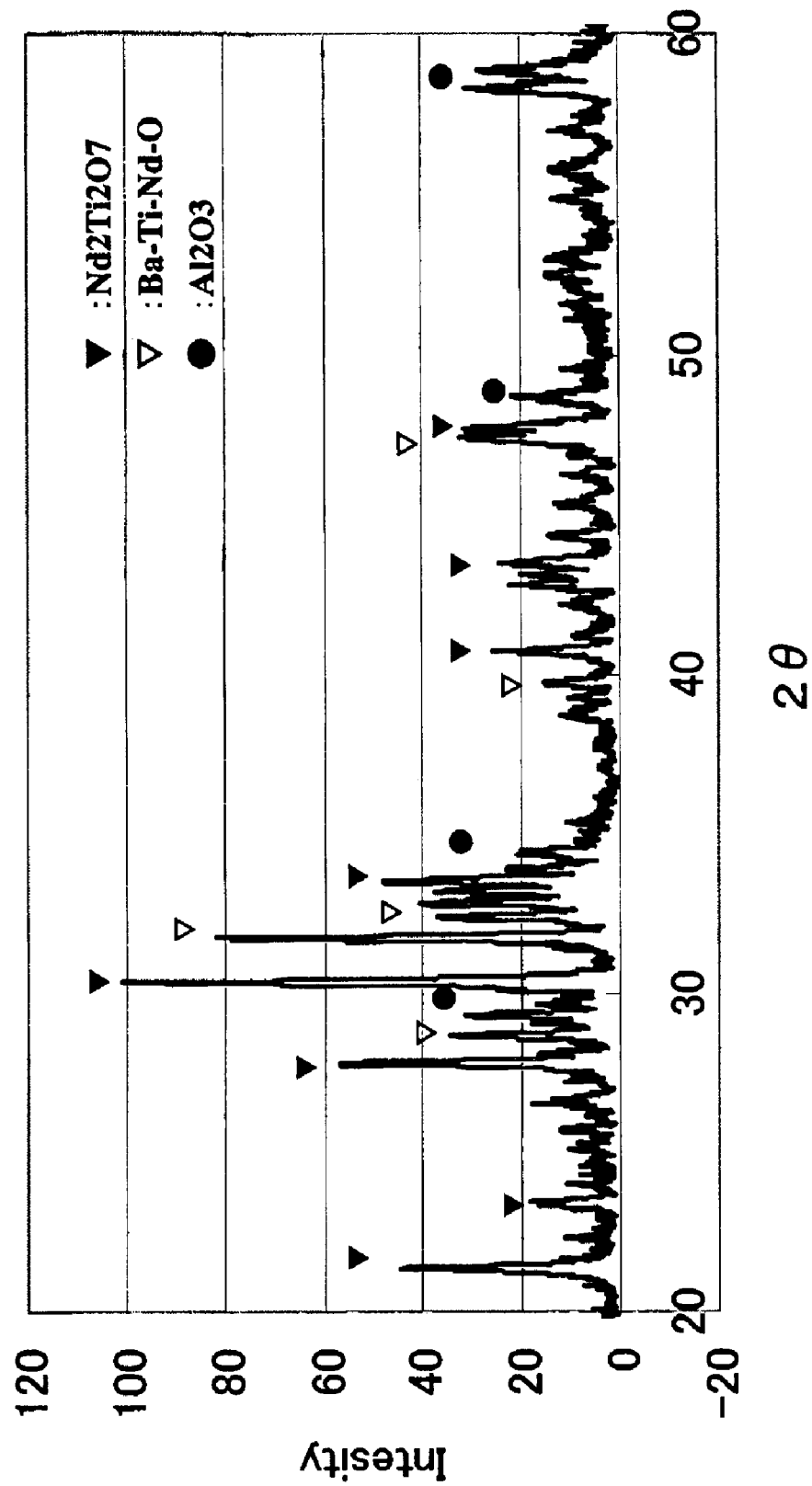
FIG. 1 shows an X-ray diffraction pattern of the dielectric ceramic composition of the second aspect of the invention.

The dielectric ceramic composition of the first aspect of the invention is such that its essential component comprises barium, titanium, neodymium and oxygen and has a compositional formula of $xBaO\text{-}yTiO_2\text{-}zNd_2O_3$ (wherein $0.02 \leq x \leq 0.2$, $0.6 \leq y \leq 0.8$, $0.01 \leq z \leq 0.3$, $x+y+z=1$), and it contains a first glass component comprising PbO, ZnO and $B_2O_3$ and a second glass component comprising $SiO_2$ and $B_2O_3$ with $10 \leq a \leq 80$ and $1 \leq b \leq 100$ wherein a indicates the content of the first glass component and b indicates the content of the second glass component both in terms of parts by weight thereof relative to 100 parts by weight of the essential component, and contains a third component comprising $Al_2O_3$, $SrTiO_3$, $GeO_2$ and $Li_2O$ with $1 \leq c \leq 60$, $0.1 \leq d \leq 30$, $5 \leq e \leq 30$ and $0.1 \leq f \leq 7$ wherein "c" indicates the content of $Al_2O_3$, "d" indicates the content of $SrTiO_3$, "e" indicates the content of $GeO_2$ and "f" indicates the content of $Li_2O$ all in terms of parts by weight thereof relative to 100 parts by weight of the essential component. Having the constitution, the dielectric ceramic composition can be sintered at low temperatures, its dielectric constant $\epsilon_r$ falls between 10 and 55 or so, its unloaded Q falls, for example, between 3400 and 5000 GHz in terms of its fQ value and is large, and its temperature coefficient of resonant frequency ($\tau_f$) falls between −12 and 12 ppm/° C., indicating that the temperature dependency of its resonant frequency is low. This means that the characteristics of the dielectric ceramic composition fluctuate little and are all the time stable, not depending on the ambient temperature change.

In the dielectric ceramic composition of the first aspect of the invention, if the molar fraction of BaO of its essential component is too large, the composition could not resonate with any others; but if too small, the dielectric constant and the unloaded Q of the composition will be low. On the other hand, if the molar fraction of $TiO_2$ in the composition is too large, the temperature coefficient of the resonant frequency of the composition will increase; but if too small, the dielectric constant thereof will lower. If the molar fraction of $Nd_2O_3$ therein is too large, the dielectric constant and the unloaded Q of the composition will lower; and if too small, the dielectric constant thereof will also lower.

In the dielectric ceramic composition of the first aspect of the invention, if the content, "a" in terms of parts by weight relative to 100 parts by weight of the essential component, of the first glass component that comprises PbO, ZnO and $B_2O_3$, and also the content, "b" in terms of parts by weight relative to 100 parts by weight of the essential component, of the second glass component that comprises $SiO_2$ and $B_2O_3$ are too large, the unloaded Q of the composition will lower; but if the content of the first glass component that comprises PbO, ZnO and $B_2O_3$ and also the content of the second glass component that comprises $SiO_2$ and $B_2O_3$ are too small or are both zero, the composition will be difficult to sinter at low temperatures not higher than 1200° C. Accordingly, the content, "a", of the first glass component that comprises PbO, ZnO and $B_2O_3$, and the content, "b", of the second glass component that comprises $SiO_2$ and $B_2O_3$ thereof each are defined to fall within the range as above. In the first glass component, the constitutional ratio of PbO, ZnO and $B_2O_3$ is not specifically defined. However, if the ZnO content of the first glass component is too large, the glass softening point will increase and therefore the composition containing the glass component will be difficult to sinter at low temperatures. Therefore, the ZnO content of the glass component is preferably at most 50% by weight. The constitutional ratio of $SiO_2$ and $B_2O_3$ in the second glass component is not also specifically defined.

In the dielectric ceramic composition of the first aspect of the invention, if the content, "c" in terms of parts by weight relative to 100 parts by weight of the essential component, of $Al_2O_3$ of the third component is too large, the dielectric constant of the composition will lower and the composition will be difficult to sinter at low temperatures not higher than 1200° C.; but if the content of $Al_2O_3$ is too small, the unloaded Q of the composition will lower. On the other hand, if the content, "d" in terms of parts by weight relative to 100 parts by weight of the essential component, of $SrTiO_3$ of the third component is too large, the unloaded Q of the composition will lower; but if too small, the temperature-dependent resonant frequency change thereof will increase. If the content, "e", of $GeO_2$ and the content, "f", of $Li_2O$ of third component, both in terms of parts by weight relative to 100 parts by weight of the essential component, are too large, the unloaded Q of the composition will lower; but if the content of $GeO_2$ and the content of $Li_2O$ are too small or are both zero, the composition will be difficult to sinter at low temperatures not higher than 1200° C. Accordingly, the contents of the third components, $Al_2O_3$, $SrTiO_3$, $GeO_2$ and $Li_2O$ each are defined to fall within the range as above.

If desired, the dielectric ceramic composition of the first aspect of the invention may further contain, as a fourth component, at least one of $Nb_2O_5$, MnO and ZnO. Containing it, the absolute value of the temperature coefficient $\tau_f$ of the resonant frequency of the composition can be further reduced. However, if the content, "g" in terms of parts by weight relative to 100 parts by weight of the essential component, of the third component in the composition is too large, the temperature coefficient $\tau_f$ of the resonant frequency of the composition will increase. Regarding the content "g", therefore, $0 < g \leq 2$, preferably $0.1 \leq g \leq 2$.

One preferred example of producing the dielectric ceramic composition of the first aspect of the invention is described below.

Starting compounds of barium carbonate, titanium oxide and neodymium oxide are mixed in wet in a predetermined ratio in a solvent such as water or alcohol. Next, the solvent of water or alcohol is removed from the resulting mixture, which is then ground and calcined in an oxygen-containing vapor atmosphere (e.g., in air) at 1000 to 1200° C. for about 1 to 5 hours. The thus-obtained, calcined powder is mixed in wet with a first glass powder of PbO, ZnO and $B_2O_3$ and a second glass powder of $SiO_2$ and $B_2O_3$, and with the third component of $Al_2O_3$, $SrTiO_3$, $GeO_2$ and $Li_2O$, and optionally with the fourth component of at least one of $Nb_2O_5$, MnO and ZnO, in a solvent such as alcohol. Next, the solvent of water or alcohol is removed from the resulting mixture, which is then ground. Then, the thus-ground mixture is further mixed with an organic binder such as polyvinyl alcohol, homogenized, dried, ground and shaped under pressure (for example, under a pressure of from 100 to 1000 kg/cm² or so). The thus-shaped article is baked in an oxygen-containing vapor atmosphere such as air at 850 to 1100° C. to obtain the intended dielectric ceramic composition having the compositional formula mentioned above.

The dielectric ceramic composition of the second aspect of the invention is such that its essential component comprises barium, titanium, neodymium and oxygen and contains a crystalline phase of $BaO$—$TiO_2$—$Nd_2O_3$ and a crystalline phase of $Nd_2Ti_2O_7$, having a compositional formula of $s(xBaO$-$yTiO_2$-$zNd_2O_3)$-$tNd_2Ti_2O_7$ (wherein $0.02 \leq x \leq 0.2$, $0.6 \leq y \leq 0.8$, $0.01 \leq z \leq 0.3$, $x+y+z=1$, $0.1 \leq s \leq 0.8$, $0.2 \leq t \leq 0.9$, $s+t=1$), and contains a first glass component comprising PbO, ZnO and $B_2O_3$ and a second glass component comprising $SiO_2$ and $B_2O_3$ with $10 \leq a \leq 80$ and $1 \leq b \leq 100$ wherein "a" indicates the content of the first glass component and "b" indicates the content of the second glass component both in terms of parts by weight thereof relative to 100 parts by weight of the essential component, and still contains a third component comprising $Al_2O_3$, $SrTiO_3$, $GeO_2$ and $Li_2O$ with $1 \leq c \leq 60$, $0.1 \leq d \leq 30$, $5 \leq e \leq 30$ and $0.1 \leq f \leq 7$ wherein "c" indicates the content of $Al_2O_3$, "d" indicates the content of $SrTiO_3$, "e" indicates the content of $GeO_2$ and "f" indicates the content of $Li_2O$ all in terms of parts by weight thereof relative to 100 parts by weight of the essential component. Having the constitution, the dielectric ceramic composition can be sintered at low temperatures, its dielectric constant $E_r$ falls between 10 and 50 or so, its unloaded Q falls, for example, between 3500 and 5200 GHz in terms of its fQ value and is large, and its temperature coefficient of resonant frequency ($\tau_f$) falls between −15 and 12 ppm/° C., indicating that the temperature dependency of its resonant frequency is low. This means that the characteristics of the dielectric ceramic composition fluctuate little, not depending on the ambient temperature change. In addition, the $Nd_2Ti_2O_7$ content of the dielectric ceramic composition is specifically defined so as to favorably control the specific dielectric constant $\epsilon_r$, the unloaded Q and the temperature coefficient of resonant frequency ($\tau_f$) of the composition.

The dielectric ceramic composition of the second aspect of the invention is characterized in that its essential component contains a crystalline phase of $BaO$—$TiO_2$—$Nd_2O_3$ and a crystalline phase of $Nd_2Ti_2O_7$. If, however, the molar fraction of $Nd_2Ti_2O_7$ of its essential component is too large, the unloaded Q of the composition will lower; but if too small, the temperature coefficient of the resonant frequency thereof will increase. On the other hand, if the molar fraction of BaO is too large, the composition could not resonate with any others; but if too small, the dielectric constant and the unloaded Q of the composition will be low. On the other hand, if the molar fraction of $TiO_2$ in the composition is too large, the temperature coefficient of the resonant frequency of the composition will increase; but if too small, the dielectric constant thereof will lower. If the molar fraction of $Nd_2O_3$ therein is too large, the dielectric constant and the unloaded Q of the composition will lower; and if too small, the dielectric constant thereof will also lower.

In the dielectric ceramic composition of the second aspect of the invention, if the content, "a" in terms of parts by weight relative to 100 parts by weight of the essential component, of the first glass component that comprises PbO, ZnO and $B_2O_3$, and also the content, "b" in terms of parts by weight relative to 100 parts by weight of the essential component, of the second glass component that comprises $SiO_2$ and $B_2O_3$ are too large, the unloaded Q of the composition will lower; but if the content of the first glass component and the content of the second glass component are too small or are both zero, the composition will be difficult to sinter at low temperatures not higher than 1200° C. Accordingly, the content, "a", of the first glass component, and the content, "b", of the second glass component thereof each are defined to fall within the range as above. In the first glass component, the constitutional ratio of PbO, ZnO and $B_2O_3$ is not specifically defined. However, if the ZnO content of the first glass component is too large, the glass softening point will increase and therefore the composition containing the glass component will be difficult to sinter at low temperatures. Therefore, the ZnO content of the glass component is preferably at most 50% by weight. The constitutional ratio of $SiO_2$ and $B_2O_3$ in the second glass component is not also specifically defined.

In the dielectric ceramic composition of the second aspect of the invention, if the content, "c" in terms of parts by weight relative to 100 parts by weight of the essential component, of $Al_2O_3$ of the third component is too large, the dielectric constant of the composition will lower and the composition will be difficult to sinter at low temperatures not higher than 1200° C.; but if too small, the unloaded Q of the composition will lower. On the other hand, if the content, "d" in terms of parts by weight relative to 100 parts by weight of the essential component, of $SrTiO_3$ of the third component is too large, the unloaded Q of the composition will lower; but if too small, the temperature-dependent resonant frequency change thereof will increase. If the content, "e", of $GeO_2$ and the content, "f", of $Li_2O$ of the third component, both in terms of parts by weight relative to 100 parts by weight of the essential component, are too large, the unloaded Q of the composition will lower; but if the two are too small or are both zero, the composition will be difficult to sinter at low temperatures not higher than 1200° C. Accordingly, the contents of $Al_2O_3$, $SrTiO_3$, $GeO_2$ and $Li_2O$ for the third component each are defined to fall within the range as above.

If desired, the dielectric ceramic composition of the second aspect of the invention may further contain, as a fourth component, at least one of $Nb_2O_5$, MnO and ZnO. Containing it, the absolute value of the temperature coefficient $\tau_f$ of the resonant frequency of the composition can be further reduced. However, if the content, "g" in terms of parts by weight relative to 100 parts by weight of the essential component, of the fourth component in the composition is too large, the temperature coefficient $\tau_f$ of the resonant frequency of the composition will increase. Regarding the content "g", therefore, $0 < g \leq 2$, preferably $0.1 \leq g \leq 2$.

One preferred example of producing the dielectric ceramic composition of the second aspect of the invention is described below.

Starting compounds of barium carbonate, titanium oxide and neodymium oxide are mixed in wet in a predetermined ratio in a solvent such as water or alcohol. Next, the solvent of water or alcohol is removed from the resulting mixture, which is then ground and calcined in an oxygen-containing vapor atmosphere (e.g., in air) at 1000 to 1200° C. for about 1 to 5 hours to prepare a calcined powder of $xBaO-yTiO_2-zNd_2O_3$. In the same manner as above, starting compounds of titanium oxide and neodymium oxide are mixed in wet in a predetermined ratio in a solvent such as water or alcohol; then the solvent of water or alcohol is removed from the resulting mixture, and the mixture is ground and calcined in an oxygen-containing vapor atmosphere (e.g., in air) at 1000 to 1200° C. for about 1 to 5 hours to prepare a calcined powder of $Nd_2Ti_2O_7$. The thus-prepared, two calcined powders are mixed in wet with a first glass powder of PbO, ZnO and $B_2O_3$ and a second glass powder of $SiO_2$ and $B_2O_3$, and with the third component of $Al_2O_3$, $SrTiO_3$, $GeO_2$ and $Li_2O$, and optionally with the fourth component of at least one of $Nb_2O_5$, MnO and ZnO, in a solvent such as alcohol. Next, the solvent of water or alcohol is removed from the resulting mixture, which is then ground. Then, the thus-ground mixture is further mixed with an organic binder such as polyvinyl alcohol, homogenized, dried, ground and shaped under pressure (for example, under a pressure of from 100 to 1000 kg/cm$^2$ or so). The thus-shaped article is baked in an oxygen-containing vapor atmosphere such as air at 850 to 1100° C. to obtain the intended dielectric ceramic composition having the compositional formula mentioned above.

Thus obtained, the dielectric ceramic composition of the first and second aspects of the invention is optionally worked into a suitable shape of a desired size, or formed into a sheet using a doctor blade or the like, and the sheet may be laminated with an electrode to fabricate dielectric resonators, dielectric substrates, stacked devices, etc. For the materials of barium, titanium, neodymium, lead, boron, silicon, aluminium, strontium, germanium, lithium, niobium, manganese and zinc for the dielectric ceramic composition of the first and second aspects of the invention, usable are $BaCO_3$, $TiO_2$, $Nd_2O_3$, PbO, $B_2O_3$, $SiO_2$, $Al_2O_3$, $SrCO_3$, $GeO_2$, $Li_2O$, $Nb_2O_5$, MnO and also carbonates, nitrates, hydroxides and others that give the corresponding oxides when fired. In particular, for the material of the component $Li_2O$, preferred is $Li_2CO_3$ in view of its good sinterability.

The invention is described more concretely with reference to the following Examples and Comparative Examples. Examples 1 to 14 and Comparative Examples 1 to 18 are those for the dielectric ceramic composition of the first aspect of the invention; and Examples 15 to 28 and Comparative Examples 19 to 38 are those for the dielectric ceramic composition of the second aspect of the invention.

EXAMPLE 1

0.08 mols of barium carbonate ($BaCO_3$) powder, 0.73 mols of titanium oxide ($TiO_2$) powder and 0.19 mols of neodymium oxide were put into a ball mill along with ethanol, and mixed in wet for 12 hours. The solvent was removed, and the resulting mixture was ground and calcined in air at 1200° C. To the thus-obtained, calcined powder to be the essential component, added were 36 parts by weight, relative to 100 parts by weight of the essential component, of a glass powder A comprised of 84% by weight of lead oxide (PbO), 7% by weight of zinc oxide (ZnO) and 9% by weight of boron oxide ($B_2O_3$), 17 parts by weight of a glass powder B comprised of 80% by weight of silicon oxide ($SiO_2$) and 20% by weight of boron oxide ($B_2O_3$), and 11 parts by weight of aluminium oxide ($Al_2O_3$) powder, 7 parts by weight of strontium titanate ($SrTiO_3$), 16 parts by weight of germanium oxide ($GeO_2$), and 3 parts by weight, in terms of lithium oxide ($Li_2O$), of lithium carbonate ($Li_2CO_3$), and put into a ball mill along with ethanol, and mixed in wet for 24 hours. The solvent was removed, and the resulting mixture was ground, to which was added a suitable amount of a polyvinyl alcohol solution. After dried, this was pelletized into pellets each having a diameter of 12 mm-φ and a thickness of 4 mm-t. The pellets were baked in air at 950° C. for 2 hours.

The thus-obtained ceramic composition was worked into pellets each having a diameter of 7 mm-φ and a thickness of about 3 mm-t. According to a dielectric resonance method, the pellets of the composition were tested to determine the unloaded Q at a resonant frequency of from 5 to 10 GHz, the relative dielectric constant, and the temperature coefficient of the resonant frequency thereof. The data obtained are given in Table 2, in which fQ is a product of the resonant frequency and the unloaded Q of the sample tested.

EXAMPLES 2 TO 14

Dielectric ceramic compositions were produced in the same manner as in Example 1, for which, however, the blend ratio of barium carbonate, titanium oxide and neodymium oxide to form the essential component, and also the amount of the side components to be added to the essential component, or that is, the amount of the glass powder A composed of PbO, ZnO and $B_2O_3$, that of the glass powder B composed of $SiO_2$ and $B_2O_3$, that of the third component of $Al_2O_3$, $SrTiO_3$, $GeO_2$ and $Li_2O$, and that of the fourth component were varied as in Examples 2 to 14 in Table 1 below. Thus produced, the properties of the dielectric ceramic compositions were measured, and the data thereof obtained are given in Table 2.

Comparative Examples 1 to 18

Dielectric ceramic compositions were produced in the same manner as in Example 1, for which, however, the blend ratio of barium carbonate, titanium oxide and neodymium oxide to form the essential component, and also the amount of the side components to be added to the essential component, or that is, the amount of the glass powder A composed of PbO, ZnO and $B_2O_3$, that of the glass powder B composed of $SiO_2$ and $B_2O_3$, that of the third component of $Al_2O_3$, $SrTiO_3$, $GeO_2$ and $Li_2O$, and that of the fourth component were varied as in Examples 2 to 14 in Table 1 below. Thus produced, the properties of the dielectric ceramic compositions were measured, and the data thereof obtained are given in Table 2.

TABLE 1

Dielectric Ceramic Compositions

| No | BaO x (mols) | TiO2 y (mols) | Nd2O3 z (mols) | Glass A a (wt. pts.) | Glass B b (wt. pts.) | Al2O3 c (wt. pts.) | SrTiO3 d (wt. pts.) | GeO2 e (wt. pts.) | Li2O f (wt. pts.) | Fourth component Compound | g (wt. pts.) | Sintering Temperature (° C.) |
|---|---|---|---|---|---|---|---|---|---|---|---|---|
| Examples | | | | | | | | | | | | |
| 1 | 0.08 | 0.73 | 0.19 | 36 | 17 | 11 | 7 | 16 | 3 | — | — | 950 |
| 2 | 0.08 | 0.73 | 0.19 | 37 | 20 | 13 | 8 | 16 | 3 | — | | 920 |
| 3 | 0.07 | 0.73 | 0.20 | 31 | 17 | 11 | 7 | 14 | 3 | — | | 890 |
| 4 | 0.08 | 0.73 | 0.19 | 38 | 23 | 15 | 9 | 17 | 3 | — | | 910 |
| 5 | 0.09 | 0.73 | 0.18 | 34 | 12 | 8 | 5 | 15 | 3 | — | | 870 |
| 6 | 0.05 | 0.74 | 0.21 | 43 | 38 | 26 | 15 | 19 | 4 | Nb2O5 | 1 | 890 |
| 7 | 0.08 | 0.73 | 0.19 | 28 | 6 | 4 | 3 | 13 | 3 | MnO | 1 | 870 |
| 8 | 0.03 | 0.74 | 0.23 | 60 | 72 | 48 | 29 | 26 | 5 | ZnO | 1 | 900 |
| 9 | 0.09 | 0.73 | 0.18 | 29 | 3 | 2 | 1 | 13 | 3 | — | | 880 |
| 10 | 0.08 | 0.73 | 0.19 | 26 | 17 | 11 | 7 | 7 | 1 | — | | 930 |
| 11 | 0.08 | 0.73 | 0.19 | 17 | 17 | 11 | 7 | 7 | 1 | — | | 900 |
| 12 | 0.07 | 0.73 | 0.20 | 38 | 14 | 10 | 6 | 17 | 4 | — | | 850 |
| 13 | 0.07 | 0.74 | 0.19 | 26 | 12 | 8 | 5 | 12 | 2 | — | | 890 |
| 14 | 0.12 | 0.72 | 0.16 | 56 | 27 | 18 | 11 | 25 | 5 | — | | 880 |
| Comparative Examples | | | | | | | | | | | | |
| 1 | 0.01 | 0.75 | 0.24 | 48 | 65 | 43 | 26 | 21 | 4 | — | — | 900 |
| 2 | 0.3 | 0.57 | 0.13 | 31 | 15 | 10 | 3 | 12 | 1 | — | — | 890 |
| 3 | 0.08 | 0.85 | 0.07 | 18 | 20 | 10 | 5 | 15 | 2 | — | | 920 |
| 4 | 0.15 | 0.45 | 0.40 | 31 | 13 | 9 | 7 | 14 | 1 | — | | 880 |
| 5 | 0.11 | 0.57 | 0.32 | 28 | 25 | 9 | 7 | 14 | 3 | — | | 850 |
| 6 | 0.2 | 0.8 | 0.00 | 43 | 26 | 11 | 7 | 15 | 2 | — | | 910 |
| 7 | 0.08 | 0.72 | 0.20 | 100 | 23 | 10 | 5 | 15 | 4 | — | | 850 |
| 8 | 0.08 | 0.73 | 0.19 | 2 | 20 | 10 | 4 | 13 | 2 | — | | 1050 |
| 9 | 0.09 | 0.73 | 0.18 | 24 | 150 | 9 | 7 | 12 | 3 | — | | 800 |
| 10 | 0.07 | 0.73 | 0.20 | 21 | 0.2 | 8 | 4 | 17 | 3 | — | | 1030 |
| 11 | 0.08 | 0.72 | 0.20 | 31 | 28 | 70 | 3 | 20 | 2 | — | | 1100 |
| 12 | 0.05 | 0.74 | 0.21 | 43 | 22 | 0.3 | 8 | 21 | 3 | — | | 940 |
| 13 | 0.09 | 0.73 | 0.18 | 17 | 21 | 3 | 40 | 15 | 3 | — | | 890 |
| 14 | 0.07 | 0.73 | 0.20 | 24 | 23 | 7 | 0.05 | 16 | 2 | — | | 900 |
| 15 | 0.08 | 0.72 | 0.20 | 16 | 17 | 8 | 7 | 35 | 3 | — | | 840 |
| 16 | 0.05 | 0.74 | 0.21 | 33 | 17 | 7 | 7 | 1 | 4 | — | | 1080 |
| 17 | 0.09 | 0.73 | 0.18 | 38 | 18 | 10 | 6 | 16 | 0.02 | — | | 1050 |
| 18 | 0.08 | 0.73 | 0.19 | 32 | 19 | 6 | 6 | 13 | 10 | — | | 900 |

TABLE 2

| | No | Electric Properties | | | |
|---|---|---|---|---|---|
| | | εr | Q | f Q (GHz) | τf (ppm/° C.) |
| Examples | 1 | 17 | 500 | 4500 | 7 |
| | 2 | 19 | 520 | 4680 | 3 |
| | 3 | 20 | 510 | 4590 | −2 |
| | 4 | 13 | 480 | 4320 | −5 |
| | 5 | 31 | 460 | 4140 | −10 |
| | 6 | 12 | 550 | 4950 | −12 |
| | 7 | 42 | 530 | 4770 | 6 |
| | 8 | 10 | 610 | 5490 | 1 |
| | 9 | 53 | 490 | 4410 | 8 |
| | 10 | 18 | 430 | 3870 | 2 |
| | 11 | 15 | 400 | 3600 | 10 |
| | 12 | 14 | 380 | 3420 | 5 |
| | 13 | 19 | 530 | 4770 | −7 |
| | 14 | 20 | 540 | 4860 | 12 |
| Comparative Examples | 1 | 5 | 200 | 1300 | −30 |
| | 2 | | No resonance | | |
| | 3 | 53 | 300 | 1950 | 130 |
| | 4 | 32 | 159 | 1010 | 33 |
| | 5 | 30 | 80 | 520 | −20 |
| | 6 | 34 | 130 | 845 | −31 |
| | 7 | 11 | 50 | 325 | −50 |
| | 8 | 23 | 350 | 2275 | 13 |
| | 9 | 12 | 360 | 2340 | −43 |
| | 10 | 25 | 290 | 1885 | 10 |
| | 11 | 13 | 450 | 2925 | −23 |
| | 12 | 26 | 210 | 1365 | 15 |
| | 13 | 38 | 150 | 975 | 90 |
| | 14 | 13 | 180 | 1170 | 12 |
| | 15 | 19 | 150 | 975 | −20 |
| | 16 | 22 | 260 | 1690 | 17 |
| | 17 | 24 | 330 | 2145 | 22 |
| | 18 | 36 | 30 | 195 | 30 |

EXAMPLE 15

0.16 mols of barium carbonate ($BaCO_3$) powder, 0.72 mols of titanium oxide ($TiO_2$) powder and 0.12 mols of neodymium oxide were put into a ball mill along with ethanol, and mixed in wet for 12 hours. The solvent was removed, and the resulting mixture was ground and calcined in air at 1200° C. In the same manner, 1.46 mols of titanium oxide ($TiO_2$) powder and 0.73 mols of neodymium oxide ($Nd_2O_3$) were put into a ball mill along with ethanol, and mixed in wet for 12 hours. The solvent was removed, and the resulting mixture was ground and calcined in air at 1200° C. to prepare a calcined powder of $Nd_2Ti_2O_7$. The thus-obtained, two calcined powders were blended in the molar ratio as in Table 3. To the resulting blend to be the essential component, added were 36 parts by weight, relative to 100 parts by weight of the essential component, of a glass powder A comprised of 84% by weight of lead oxide (PbO), 7% by weight of zinc oxide (ZnO) and 9% by weight of boron oxide ($B_2O_3$), 17 parts by weight of a glass powder B comprised of 80% by weight of silicon oxide ($SiO_2$) and 20% by weight of boron oxide ($B_2O_3$), and 11 parts by weight of aluminium oxide ($Al_2O_3$) powder, 7 parts by weight of strontium titanate ($SrTiO_3$), 16 parts by weight of germanium oxide ($GeO_2$), and 3 parts by weight, in terms of lithium oxide ($Li_2O$), of lithium carbonate ($Li_2CO_3$), and put into a ball mill along with ethanol, and mixed in wet for 24 hours. The solvent was removed, and the resulting mixture was ground, to which was added a suitable amount of a polyvinyl alcohol solution. After dried, this was pelletized into pellets each having a diameter of 12 mm-ϕ and a thickness of 4 mm-t. The pellets were baked in air at 930° C. for 2 hours.

The thus-obtained dielectric ceramic composition was analyzed through X-ray diffractometry, and it was found to have a crystalline phase of $BaO$—$TiO_2$—$Nd_2O_3$ and a crystalline phase of $Nd_2Ti_2O_7$. FIG. 1 shows the X-ray diffraction pattern of the composition.

Thus obtained, the ceramic composition was worked into pellets each having a diameter of 7 mm-ϕ and a thickness of about 3 mm-t. According to a dielectric resonance method, the pellets of the composition were tested to determine the unloaded Q at a resonant frequency of from 5 to 10 GHz, the relative dielectric constant, and the temperature coefficient of the resonant frequency thereof. The data obtained are given in Table 4, in which fQ is a product of the resonant frequency and the unloaded Q of the sample tested.

EXAMPLES 16 TO 28

Dielectric ceramic compositions were produced in the same manner as in Example 15, for which, however, the blend ratio of barium carbonate, titanium oxide and neodymium oxide to form the essential component, and also the amount of the first glass powder A composed of PbO, ZnO and $B_2O_3$, that of the second glass powder B composed of $SiO_2$ and $B_2O_3$, that of the third component composed of $Al_2O_3$, $SrTiO_3$, $GeO_2$ and $Li_2O$, and that of the fourth component to be added to the essential component were varied as in Examples 16 to 28 in Table 3 below. Thus produced, the properties of the dielectric ceramic compositions were measured, and the data thereof obtained are given in Table 4.

Comparative Examples 19 to 38

Dielectric ceramic compositions were produced in the same manner as in Example 15, for which, however, the blend ratio of barium carbonate, titanium oxide and neodymium oxide to form the essential component, and also the amount of the first glass powder A composed of PbO, ZnO and $B_2O_3$, that of the second glass powder B composed of $SiO_2$ and $B_2O_3$, that of the third component composed of $Al_2O_3$, $SrTiO_3$, $GeO_2$ and $Li_2O$, and that of the fourth component to be added to the essential component were varied as in Comparative Examples 19 to 38 in Table 3 below. Thus produced, the properties of the dielectric ceramic compositions were measured, and the data thereof obtained are given in Table 4.

TABLE 3

Dielectric Ceramic Compositions

| No | BaO x | TiO2 y | Nd2O3 z | s | Nd2Ti2O7 t | Glass A a (wt. pts.) | Glass B b (wt. pts.) | Al2O3 c (wt. pts.) | SrTiO3 d (wt. pts.) | GeO2 e (wt. pts.) | Li2O f (wt. pts.) | Fourth component Compound | g (wt. pts.) | Sintering Temperature (° C.) |
|---|---|---|---|---|---|---|---|---|---|---|---|---|---|---|
| Examples | | | | | | | | | | | | | | |
| 15 | 0.16 | 0.72 | 0.12 | 0.50 | 0.50 | 36 | 17 | 11 | 7 | 16 | 3 | — | | 930 |
| 16 | 0.17 | 0.71 | 0.12 | 0.43 | 0.57 | 34 | 14 | 10 | 6 | 13 | 3 | — | | 910 |
| 17 | 0.15 | 0.72 | 0.13 | 0.38 | 0.62 | 26 | 12 | 8 | 5 | 12 | 2 | — | | 900 |
| 18 | 0.16 | 0.71 | 0.13 | 0.60 | 0.40 | 44 | 21 | 14 | 8 | 20 | 4 | — | | 880 |
| 19 | 0.15 | 0.71 | 0.14 | 0.75 | 0.25 | 56 | 27 | 18 | 11 | 25 | 5 | — | | 870 |
| 20 | 0.14 | 0.72 | 0.14 | 0.34 | 0.66 | 23 | 11 | 7 | 4 | 10 | 2 | Nb2O5 | 1 | 890 |
| 21 | 0.15 | 0.74 | 0.11 | 0.30 | 0.70 | 21 | 10 | 7 | 4 | 9 | 2 | MnO | 1 | 870 |
| 22 | 0.16 | 0.73 | 0.11 | 0.48 | 0.52 | 37 | 20 | 13 | 8 | 16 | 3 | ZnO | 1 | 900 |
| 23 | 0.15 | 0.72 | 0.13 | 0.51 | 0.49 | 31 | 11 | 7 | 4 | 14 | 3 | — | | 890 |
| 24 | 0.15 | 0.74 | 0.11 | 0.47 | 0.53 | 20 | 6 | 4 | 2 | 5 | 1 | — | | 910 |
| 25 | 0.17 | 0.71 | 0.12 | 0.46 | 0.54 | 18 | 23 | 15 | 9 | 7 | 1 | — | | 890 |
| 26 | 0.15 | 0.72 | 0.13 | 0.27 | 0.73 | 44 | 31 | 21 | 12 | 20 | 5 | — | | 860 |
| 27 | 0.16 | 0.72 | 0.12 | 0.17 | 0.83 | 31 | 32 | 21 | 13 | 14 | 3 | — | | 880 |
| 28 | 0.16 | 0.72 | 0.12 | 0.27 | 0.73 | 19 | 9 | 6 | 4 | 8 | 2 | — | | 910 |
| Comparative Examples | | | | | | | | | | | | | | |
| 19 | 0.01 | 0.75 | 0.24 | 0.50 | 0.50 | 48 | 65 | 43 | 26 | 21 | 4 | — | | 890 |
| 20 | 0.31 | 0.57 | 0.12 | 0.48 | 0.52 | 31 | 15 | 10 | 3 | 12 | 1 | — | | 890 |
| 21 | 0.08 | 0.85 | 0.07 | 0.60 | 0.40 | 18 | 20 | 10 | 5 | 15 | 2 | — | | 910 |
| 22 | 0.15 | 0.45 | 0.40 | 0.52 | 0.48 | 31 | 13 | 9 | 7 | 14 | 1 | — | | 890 |
| 23 | 0.11 | 0.57 | 0.32 | 0.39 | 0.61 | 28 | 25 | 9 | 7 | 14 | 3 | — | | 860 |
| 24 | 0.2 | 0.8 | 0.00 | 0.75 | 0.25 | 43 | 26 | 11 | 7 | 15 | 2 | — | | 910 |
| 25 | 0.16 | 0.73 | 0.11 | 0.55 | 0.45 | 100 | 23 | 10 | 5 | 15 | 4 | — | | 850 |
| 26 | 0.15 | 0.73 | 0.12 | 0.45 | 0.55 | 2 | 20 | 10 | 4 | 13 | 2 | — | | 1160 |
| 27 | 0.16 | 0.73 | 0.11 | 0.60 | 0.40 | 24 | 150 | 9 | 7 | 12 | 3 | — | | 800 |
| 28 | 0.07 | 0.73 | 0.20 | 0.58 | 0.42 | 21 | 0.2 | 8 | 4 | 17 | 3 | — | | 1130 |

TABLE 3-continued

Dielectric Ceramic Compositions

| No | BaO x | TiO2 y | Nd2O3 z | s | Nd2Ti2O7 t | Glass A a (wt. pts.) | Glass B b (wt. pts.) | Al2O3 c (wt. pts.) | SrTiO3 d (wt. pts.) | GeO2 e (wt. pts.) | Li2O f (wt. pts.) | Fourth component Compound | Fourth component g (wt. pts.) | Sintering Temperature (° C.) |
|---|---|---|---|---|---|---|---|---|---|---|---|---|---|---|
| 29 | 0.15 | 0.73 | 0.12 | 0.52 | 0.48 | 31 | 28 | 70 | 3 | 20 | 2 | — | | 1150 |
| 30 | 0.15 | 0.73 | 0.12 | 0.48 | 0.52 | 43 | 22 | 0.3 | 8 | 21 | 3 | — | | 940 |
| 31 | 0.15 | 0.73 | 0.12 | 0.37 | 0.63 | 17 | 21 | 3 | 40 | 15 | 3 | — | | 890 |
| 32 | 0.07 | 0.73 | 0.20 | 0.45 | 0.55 | 24 | 23 | 7 | 0.05 | 16 | 2 | — | | 900 |
| 33 | 0.16 | 0.73 | 0.11 | 0.50 | 0.50 | 16 | 17 | 8 | 7 | 35 | 3 | — | | 840 |
| 34 | 0.15 | 0.73 | 0.12 | 0.56 | 0.44 | 33 | 17 | 7 | 7 | 1 | 4 | — | | 1200 |
| 35 | 0.15 | 0.73 | 0.12 | 0.45 | 0.55 | 38 | 18 | 10 | 6 | 16 | 0.03 | — | | 1130 |
| 36 | 0.08 | 0.73 | 0.19 | 0.38 | 0.52 | 32 | 19 | 6 | 6 | 13 | 10 | — | | 900 |
| 37 | 0.16 | 0.73 | 0.11 | 0.05 | 0.95 | 31 | 12 | 5 | 7 | 17 | 2 | — | | 870 |
| 38 | 0.15 | 0.73 | 0.12 | 0.92 | 0.08 | 28 | 14 | 9 | 4 | 20 | 1 | — | | 920 |

TABLE 4

| | | | Electric Properties | | |
|---|---|---|---|---|---|
| | No | ϵr | Q | f Q (GHz) | τ f (ppm/° C.) |
| Examples | 15 | 18 | 510 | 4590 | 6 |
| | 16 | 17 | 530 | 4770 | 4 |
| | 17 | 15 | 500 | 4500 | −3 |
| | 18 | 24 | 480 | 4320 | 8 |
| | 19 | 31 | 460 | 4140 | 11 |
| | 20 | 15 | 550 | 4950 | −7 |
| | 21 | 42 | 530 | 4770 | 6 |
| | 22 | 21 | 490 | 4410 | 4 |
| | 23 | 28 | 450 | 4050 | 8 |
| | 24 | 37 | 420 | 3780 | 11 |
| | 25 | 22 | 520 | 4680 | 5 |
| | 26 | 14 | 570 | 5130 | −3 |
| | 27 | 13 | 560 | 5040 | −6 |
| | 28 | 24 | 480 | 4320 | −15 |
| Comparative Examples | 19 | 6 | 150 | 975 | −30 |
| | 20 | | | No resonance | |
| | 21 | 51 | 120 | 780 | 130 |
| | 22 | 28 | 159 | 1030 | 46 |
| | 23 | 30 | 80 | 520 | −37 |
| | 24 | 33 | 120 | 780 | −40 |
| | 25 | 12 | 40 | 260 | −68 |
| | 26 | 23 | 280 | 1820 | 30 |
| | 27 | 10 | 50 | 325 | −55 |
| | 28 | 22 | 130 | 845 | 34 |
| | 29 | 11 | 250 | 1625 | −29 |
| | 30 | 23 | 210 | 1365 | 25 |
| | 31 | 45 | 120 | 780 | 140 |
| | 32 | 21 | 160 | 1040 | 19 |
| | 33 | 15 | 130 | 845 | −20 |
| | 34 | 23 | 190 | 1235 | 34 |
| | 35 | 20 | 270 | 1755 | 6 |
| | 36 | 13 | 120 | 780 | −3 |
| | 37 | 21 | 130 | 845 | −26 |
| | 38 | 24 | 350 | 2275 | 49 |

What is claimed is:

1. A dielectric ceramic composition including as an essential component a composition represented by the formula of $xBaO\text{-}yTiO_2\text{-}zNd_2O_3$, wherein $0.02 \leq x \leq 0.2$, $0.6 \leq y \leq 0.8$, $0.01 \leq z \leq 0.3$, $x+y+z=1$, with the ceramic composition further comprising:

a first glass component comprising PbO, ZnO and $B_2O_3$;

a second glass component, comprising $SiO_2$ and $B_2O_3$, with the first and second component having the following relationship $10 \leq a \leq 80$ and $1 \leq b \leq 100$ wherein "a" indicates the content of the first glass component and "b" indicates the content of the second glass component with both "a" and "b" in parts by weight relative to 100 parts by weight of the essential component; and a third component comprising $Al_2O_3$, $SrTiO_3$, $GeO_2$ and $Li_2O$ with the content of each such compound to be determined from the following: $1 \leq c \leq 60$, $0.1 \leq d \leq 30$, $5 \leq e \leq 30$ and $0.1 \leq f \leq 7$, wherein "c" indicates the content of $Al_2O_3$, "d" indicates the content of $SrTiO_3$, "e" indicates the content of $GeO_2$ and "f" indicates the content of $Li_2O$ all in parts by weight relative to 100 parts by weight of the essential component.

2. A dielectric ceramic composition including as an essential component a composition represented by the formula of $s(xBaO\text{-}yTiO_2\text{-}zNd_2O_3)\text{-}tNd_2Ti_2O_7$, wherein $0.02 \leq x \leq 0.2$, $0.6 \leq y \leq 0.8$, $0.01 \leq z \leq 0.3$, $x+y+z=1$, $0.1 \leq s \leq 0.8$, $0.2 \leq t \leq 0.9$, $s+t=1$, with the ceramic composition further comprising:

a first glass component comprising PbO, ZnO and $B_2O_3$;

a second glass component comprising $SiO_2$ and $B_2O_3$, with the first and second component having the following relationship $10 \leq a \leq 80$ and $1 \leq b \leq 100$ wherein "a" indicates the content of the first glass component and "b" indicates the content of the second glass component with both "a" and "b" in parts by weight relative to 100 parts by weight of the essential component; and a third component comprising $Al_2O_3$, $SrTiO_3$, $GeO_2$ and $Li_2O$ with the content of each such compound to be determined from the following: $1 \leq c \leq 60$, $0.1 \leq d \leq 30$, $5 \leq e \leq 30$ and $0.1 \leq f \leq 7$, wherein "c" indicates the content of $Al_2O_3$, "d" indicates the content of $SrTiO_3$, "e" indicates the content of $GeO_2$ and "f" indicates the content of $Li_2O$ all in parts by weight relative to 100 parts by weight of the essential component.

3. The dielectric ceramic composition as claimed in claim 1, which further contains, as a fourth component, at least one of $Nb_2O_5$, MnO and ZnO with $0 < g \leq 2$ wherein "g" indicates the content of at least one of $Nb_2O_5$, MnO and ZnO in terms of parts by weight relative to 100 parts by weight of the essential component.

4. A method for producing the dielectric ceramic composition of claim 2, comprising the step of mixing a calcined powder of $xBaO\text{-}yTiO_2\text{-}zNd_2O_3$, wherein $0.02 \leq x \leq 0.2$, $0.6 \leq y \leq 0.8$, $0.01 \leq z \leq 0.3$, $x+y+z=1$ and a calcined powder of $Nd_2Ti_2O_7$ in a predetermined ratio and baking the mixed powders.

5. The dielectric ceramic composition as claimed in claim 2, which further contains, as a fourth component, at least one of $Nb_2O_5$, MnO and ZnO with $0<g\leqq 2$ wherein "g" indicates the content of at least one of $Nb_2O_5$, MnO and ZnO in terms of parts by weight relative to 100 parts by weight of the essential component.

* * * * *